United States Patent
Putz

(10) Patent No.: US 11,285,808 B2
(45) Date of Patent: Mar. 29, 2022

(54) MODULAR DRIVE TRAIN AND A VEHICLE COMPRISING SUCH A DRIVE TRAIN

(71) Applicant: SYN TRAC GmbH, Bad Goisern (AT)

(72) Inventor: Stefan Putz, Bad Goisern (AT)

(73) Assignee: SYN TRAC GmbH, Bad Goisern (AT)

(*) Notice: Subject to any disclaimer, the term of this patent is extended or adjusted under 35 U.S.C. 154(b) by 0 days.

(21) Appl. No.: 16/870,590

(22) Filed: May 8, 2020

(65) Prior Publication Data

US 2020/0269686 A1  Aug. 27, 2020

Related U.S. Application Data

(63) Continuation of application No. PCT/EP2018/080824, filed on Nov. 9, 2018.

(30) Foreign Application Priority Data

Nov. 10, 2017  (DE) .................. 10 2017 126 480.9

(51) Int. Cl.
| | |
|---|---|
| *B60K 17/346* | (2006.01) |
| *B60K 17/02* | (2006.01) |
| *B60K 17/16* | (2006.01) |
| *B60K 17/34* | (2006.01) |
| *F16H 37/08* | (2006.01) |

(52) U.S. Cl.
CPC .......... *B60K 17/3462* (2013.01); *B60K 17/02* (2013.01); *B60K 17/16* (2013.01); *B60K 17/358* (2013.01); *F16H 37/0806* (2013.01)

(58) Field of Classification Search
CPC .... B60K 17/3462; B60K 17/02; B60K 17/16; B60K 17/358; B60K 17/36; B60K 17/346; B60K 17/20; B60K 17/24; F16H 37/0806; F16H 48/20; F16H 57/02; B60Y 2200/1422; B60Y 2410/10; B60Y 2400/802

See application file for complete search history.

(56) References Cited

U.S. PATENT DOCUMENTS 4,618,022 A * 10/1986 Hayashi ............ B60K 17/3462
                                          180/233
4,895,217 A *  1/1990 Hueckler ........... B60K 23/0808
                                          180/233

(Continued)

FOREIGN PATENT DOCUMENTS

| DE | 1965532 A1 | 7/1971 |
|---|---|---|
| DE | 4416678 A1 | 11/1995 |

(Continued)

OTHER PUBLICATIONS

International Search Report for International Application No. PCT/EP2018/080824 dated Mar. 26, 2019.

*Primary Examiner* — Justin Holmes
(74) *Attorney, Agent, or Firm* — Stephen J. Kenny; Foley Hoag, LLP

(57) ABSTRACT

A vehicle is provided according to the disclosure. This vehicle comprises a gearbox, a longitudinal differential, a central tube module, at least one axle with an axle differential, wherein the axles are mounted on the central module and the longitudinal differential transmits the driving torque provided by the gearbox to the at least one axle, and a primary axle differential integrated into the powertrain between the longitudinal differential and the axle.

12 Claims, 4 Drawing Sheets

(56) References Cited

U.S. PATENT DOCUMENTS

| | | | | |
|---|---|---|---|---|
| 4,914,979 | A | * | 4/1990 | Balmforth ............ B60K 17/346 180/24.09 |
| 5,950,750 | A | * | 9/1999 | Dong .................... B60K 23/08 180/24.09 |
| 6,085,853 | A | | 7/2000 | Wernick |
| 2004/0176206 | A1 | | 9/2004 | Oates et al. |
| 2005/0224262 | A1 | | 10/2005 | Ima et al. |
| 2007/0272453 | A1 | | 11/2007 | LeBlanc et al. |
| 2011/0024222 | A1 | * | 2/2011 | Honzek ................. B60K 17/04 180/365 |
| 2015/0291026 | A1 | | 10/2015 | Meixner |
| 2020/0269686 | A1 | | 8/2020 | Putz |

FOREIGN PATENT DOCUMENTS

| | | |
|---|---|---|
| DE | 29814564 U1 | 10/1998 |
| DE | 102004009333 A1 | 9/2004 |
| DE | 102012021513 A1 | 5/2014 |
| EP | 1468859 A2 | 10/2004 |
| GB | 1298871 A | 12/1972 |
| GB | 2289451 A | 11/1995 |
| JP | S59176227 A | 10/1984 |
| JP | 2003-28273 A | 1/2003 |
| JP | 2003028273 A | 1/2003 |
| JP | 2009/202611 A | 9/2009 |
| JP | 2010120455 A | 6/2010 |
| WO | WO-2016/205480 A1 | 12/2016 |

* cited by examiner

MODULAR DRIVE TRAIN AND A VEHICLE COMPRISING SUCH A DRIVE TRAIN

CROSS-REFERENCE TO RELATED APPLICATIONS

This application is a Continuation of and claims the benefit of priority under 35 USC 120 to PCT/EP2018/080824 filed Nov. 9, 2018, which claims priority to DE 10 2017 126 480.9 filed Nov. 10, 2017, the entire contents of each are hereby incorporated by reference.

The present disclosure relates to a modular powertrain as well as a vehicle with such a powertrain.

A powertrain of a vehicle is understood in vehicle technology as all components that generate power for propulsion in the vehicle and transfer this onto the road. With conventional powertrains, where a combustion engine (Otto or diesel engine) is used, this includes the engine with the flywheel (possibly as a dual mass flywheel), the clutch with the vehicle gearbox, with multi-track vehicle the differential, the drive shafts or quick-release axle as well as the wheels. With a multi-track rear- or all-wheel drive vehicle additional propeller or cardan shafts, the viscous coupling, the possible reduction gearbox, the universal joint or the join disc, the centre bearing and possible the centre differentials(s).

SUMMARY OF THE DISCLOSED SUBJECT MATTER

It is the task of the present disclosure to provide a vehicle with a modular powertrain. A vehicle according to the disclosure comprises a gearbox, a longitudinal differential, a central tube module, at least one axle with an axle differential, wherein the axle is fitted to the central module and the longitudinal differential transfers the driving torque provided by the gearbox to the at least one axle, and a primary axle differential integrated into the powertain between the longitudinal differential and the axle. A central module as part of the present disclosure is understood as a component for connecting an axle with a powertrain of a gearbox, wherein an axle is preferably mounted on the central tube module. The longitudinal differential can preferably be integrated into the gearbox. The central tube module can preferably have an integrated lockable transverse differential.

A further axle can be mounted on the gearbox by means of a central tube. These can be further rear or further front axles, which are steered or not steered. The longitudinal differential can be integrated into the gearbox and thus distribute the driving torque of a corresponding vehicle to the further axles. A further axle or further axles with an axle differential can be permanently fitted to the first axle via central tube modules, or disconnectably connected with the axle via a coupling device, wherein the axles then form two front or two rear axles of a vehicle.

The central tube module can be a first central tube module, and a further second central tube module can be arranged on the gearbox on a side lying opposite the first central tube module in longitudinal direction. This can preferably also be equipped with an integrated lockable transverse differential. A second axle with an axle differential can also be provided, wherein this second axle is mounted on the second central tube module and the longitudinal differential transmits the driving torque provided by the gearbox to the axles.

According to the disclosure a further axle with an axle differential can be permanently mounted on the second axle via a further central tube module, or can be disconnectably connected with the second axle via a drive shaft from the primary axle differential, which is held by the axle differential and a coupling device, wherein the axles then form two front or two rear axles of a vehicle. A primary axle differential with an upstream axle differential can be integrated into the powertrain between the longitudinal differential and the axle. The longitudinal differential can distribute the driving torque provided by the gearbox between the front and rear axle(s). The front and/or rear axles can be of a steerable design.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF AN EXEMPLARY EMBODIMENT

Figure 1:
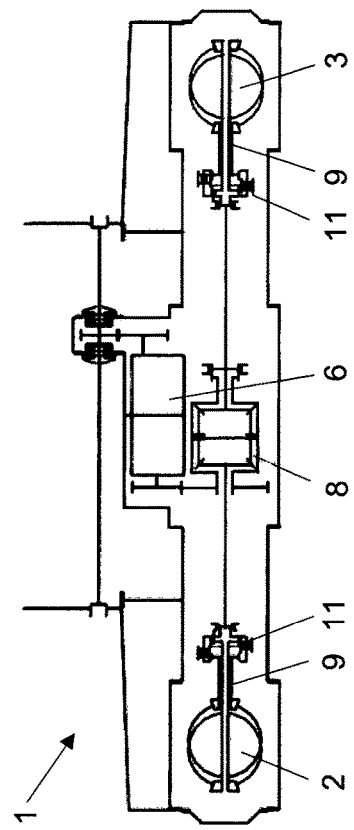
FIG. 1: a schematic illustration of a 4×4 vehicle with an engine, gearbox, front axle and rear axle and corresponding axle differentials.

The basic concept of a powertrain of a vehicle 1 according to the disclosure will now be described below (FIG. 1). In order to be able to create a powertrain 15 of a vehicle 1 according to the disclosure a vehicle kit in the form of various differential modules (differentials integrated into central tubes to form front and rear axles) is provided according to the disclosure, which can be arranged depending on the configuration of the vehicle or the base vehicle. These are described as central tube modules 9 as part of the present disclosure.

The gearbox housing of a gearbox 6, the central tube module 9 and the axle centre pieces serve as supporting elements here. The wheelbase of the vehicle is for example approx. 3,300 mm, wherein the gearbox 6 or flange to the central tube modules 9 of the front and to the rear axle is designed symmetrical to the middle of the vehicle in a longitudinal direction. The distance of this flange is for example approx. 1,224 mm. The central tubes 9 to the front and to the rear axle 2, 3 are designed as identical replacements with regard to their installation length. The central tubes or the central tube modules 9 have a length of for example approx. 750 mm. The schematic construction of a powertrain 15 for one or more vehicles according to the disclosure 1 or for a vehicle system according to the disclosure will be described below (FIGS. 1 to 9).

The vehicle 1 has the gearbox 6 with an integrated longitudinal differential 8 approximately in the middle of the vehicle and to the side next to a longitudinal vehicle axle as a central element. The longitudinal differential 8 distributes the driving torque made available by the gearbox 6 between a vehicle front and a vehicle rear. The longitudinal differential 8 is equipped with a differential lock 10 (FIG. 1).

An identical central tube module 9 with an integrated lockable transverse differential 11 as an axle differential 11 is installed on the gearbox 6 as well as in the vehicle front and in the rear vehicle structure. Also installed on the central tubes 9 are the front longitudinal axis 2 or, optionally, a steered or non-steered axle 3 at the rear. In principle a longitudinal differential 8, a primary axle differential 12 and an axle differential 11 as well as at least one permanently mounted axle 2, 3 are successively arranged in the powertrain of the vehicle 1 in the basic version as a 4×4 vehicle.

Figure 2:
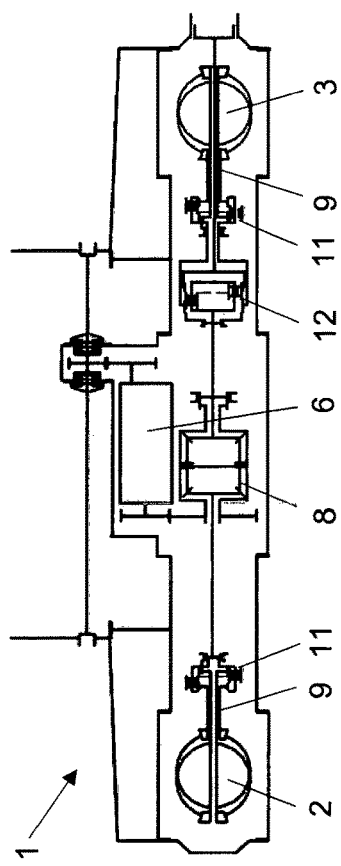
FIG. 2: a schematic illustration of a 4×4 base vehicle with an additional primary axle differential.
Figure 3:
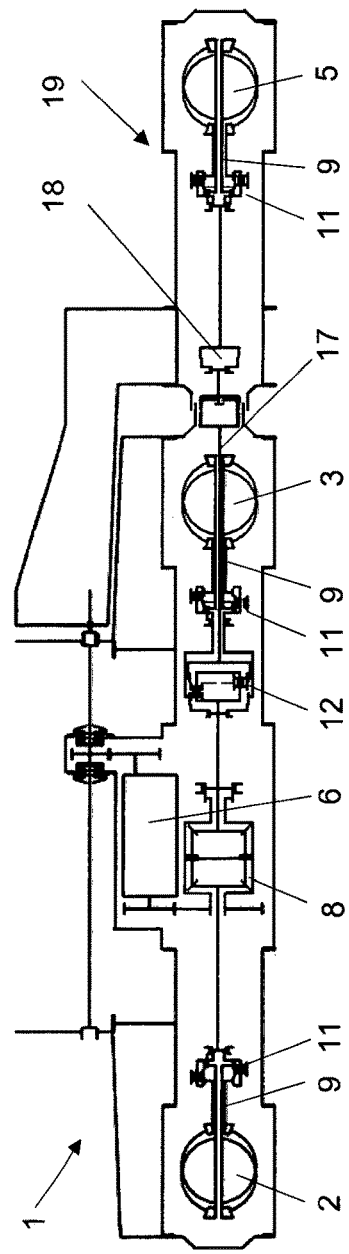
FIG. 3: the vehicle from FIG. 2 with a coupled additional axle, so that a 6×6 vehicle with permanent all-wheel drive is created.

The vehicle 1 of FIG. 1 has a primary axle differential 12 (FIG. 2). An additional axle can be coupled to such a 4×4 vehicle. Connecting the coupled second rear axle 5 with the powertrain 15 of the vehicle makes this a 6×6 vehicle with permanent all-wheel drive (FIG. 3). In order to couple the said additional axle 5 the axle 5 to be coupled is coupled with the primary axle differential 12 via a coupling device 14, which is arranged before the first, permanently mounted axle 2, 3. The further axle 5 to be coupled is coupled via a drive shaft 17 held by the axle differential 11 of the first permanently mounted axle 2, 3 by means of a coupling device 14 for this, and can thus be driven. The coupling device 14 is for example a claw coupling that is known in itself, with which the drive shaft 17 and the shaft of the axle 5 to be coupled are rotatably connected with each other.

Figure 4:
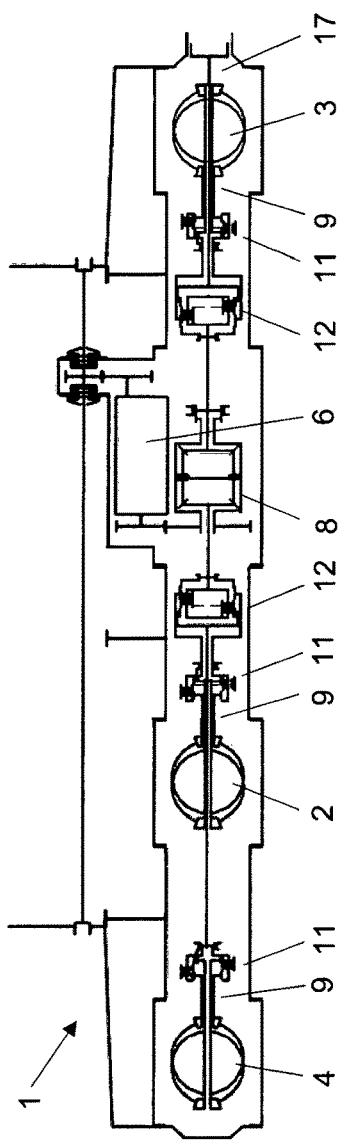
FIG. 4: a schematic illustration of a 6×6 base vehicle with a further primary axle differential.
Figure 5:
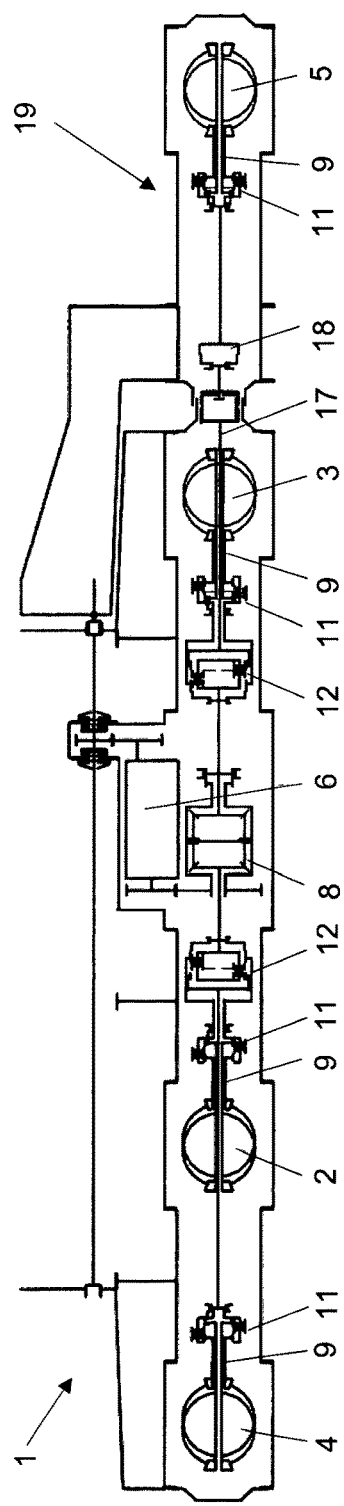
FIG. 5: the 6×6 vehicle from FIG. 4 with a coupled additional axle, so that an 8×8 vehicle with permanent all-wheel drive is created.

A powertrain 15 for a vehicle 1 with two front axles 2, 4 looks as follows according to the disclosure (FIG. 4). With a 6×6 drive with two front axles 2, 4 a first front central tube module 9 is equipped with an additional primary axle differential 12. The driving torque provided by the longitudinal differential 8 is transmitted to the axle differential of the first and second front axle 2, 4 by the primary differential 12. The rear axle is driven in the same way as the 4×4 powertrain. Such a 4×4 vehicle 1 can be coupled with an additional axle 5. Connecting the coupled second rear axle 5 with the powertrain 15 of the vehicle 1 makes this an 8×8 vehicle with permanent all-wheel drive (FIG. 5).

Figure 6:
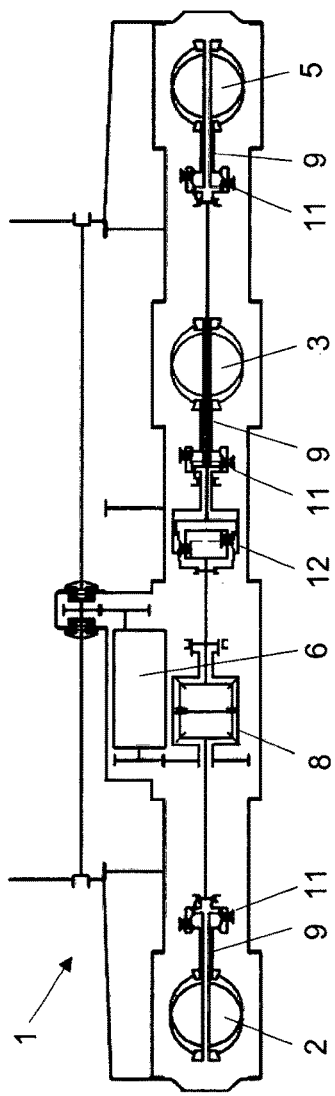
FIG. 6: a schematic illustration of a 6×6 vehicle with two rear axles.
Figure 7:
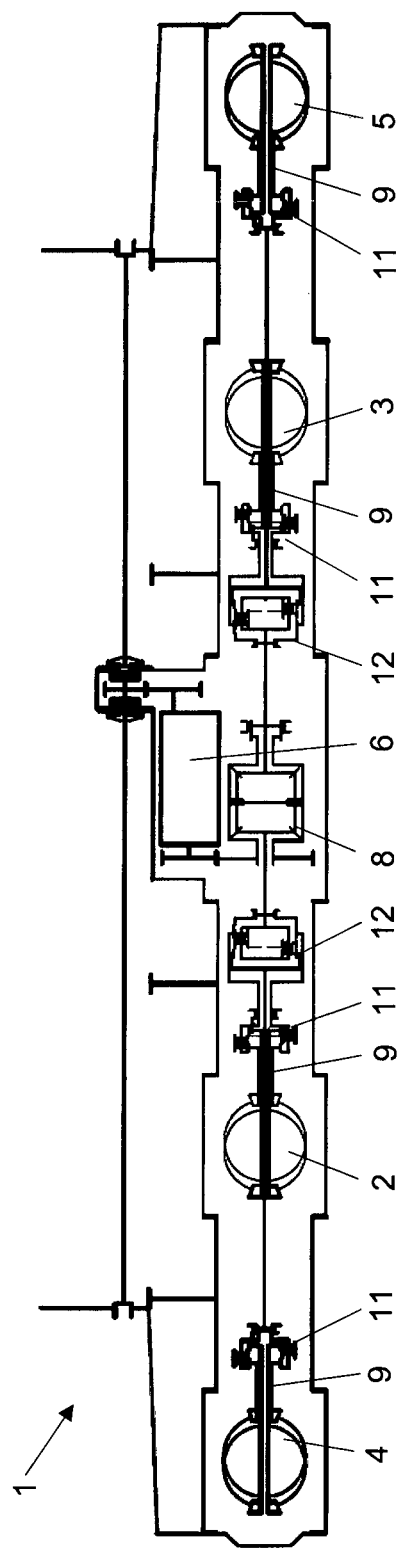
FIG. 7: a schematic illustration of an 8×8 vehicle.

A powertrain 15 designed as a 6×6 vehicle with two rear axles 3, 5 for a vehicle 1 looks as follows (FIG. 6). With a 6×6 drive with two rear axles 3, 5 the front first central tube module 9 is additionally equipped with a primary axle differential. The driving torque provided by the longitudinal differential is transmitted to the axle differentials of the first and second rear axle 3, 5 by the primary differential 12. The rear axle 2 is driven in the same way as the 6×6 powertrain with two front axles 2, 4. A powertrain of an 8×8 vehicle with two front axles 2, 4 and two rear axles 3, 5 for a vehicle looks as follows (FIG. 7). With an 8×8 drive the front powertrain is constructed like the 6×6 powertrain with two front axles 2, 4, and the rear powertrain like a 6×6 powertrain with two rear axles 3, 5.

A powertrain 15 for a selective 4×4 or 6×6 vehicle, which is equipped with two further rear axles 3, 5, looks as follows (FIGS. 6 and 7). The powertrain 15 can be coupled as a 4×4 or a 6×6 (2 rear axles) here. A transverse differential module is installed between the gearbox 6 and the front steering axle. A transverse and primary axle module is provided between the gearbox and the steerable rear axle HAL One side of a claw coupling is integrated on the first rear axle in a docking holder (coupling device for connection).

The axle module 19 to be coupled has a docking insert (coupling device for connection), in which the second side of the claw coupling for the coupling device 14 is integrated, a central rube module with a separating clutch 18 and a lockable transverse differential 11 as an axle differential 11 and a driven axle. If the vehicle is operated without a coupled addition axle the primary differential must be locked. In this way the vehicle can be operated as a 4×4 with permanent all-wheel drive and lockable differentials. Coupling the additional axle 4, 5 in the additional axle module 19 connects both parts of a claw coupling 14 connecting a drive shaft by means of a coupling or a docking device with each other and allows a torque transmission to the coupled axle 4, 5. In order to prevent a rotation of the docking insert-side claw element during the docking process a separating clutch 18 is provided between claw coupling 14 and transverse differential 11. After the docking process the separating clutch 18 is closed and the primary differential lock opened. The vehicle can now be operated like a vehicle with permanent 6×6 drive with lockable differentials.

Figure 8:
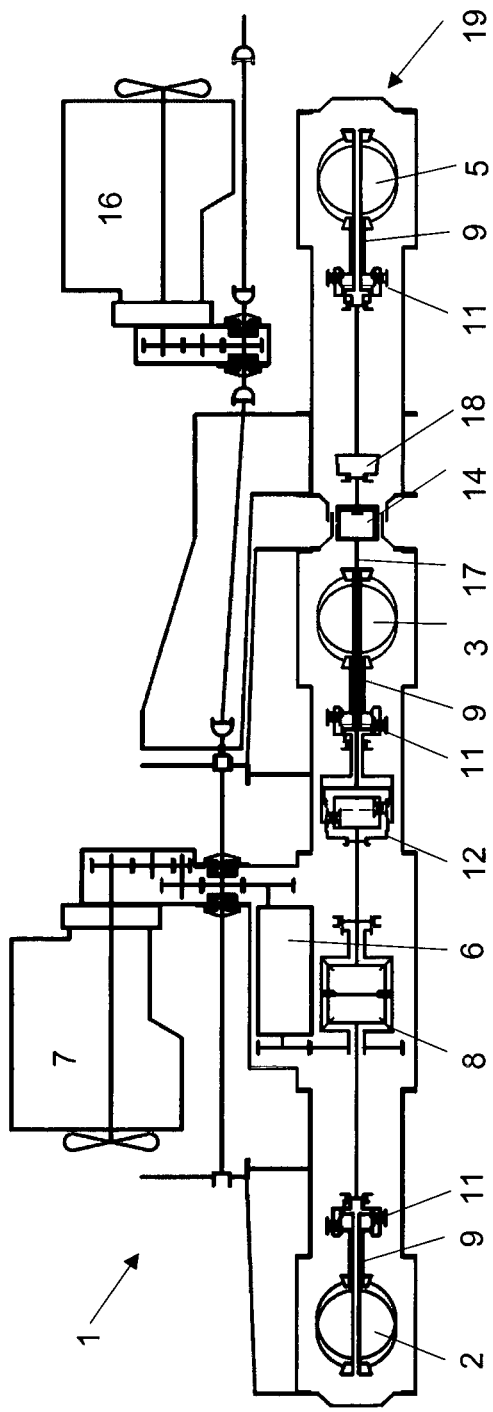
FIG. 8: a schematic illustration of a 4×4 base vehicle with a coupled additional axle and a coupled additional engine.
Figure 9:
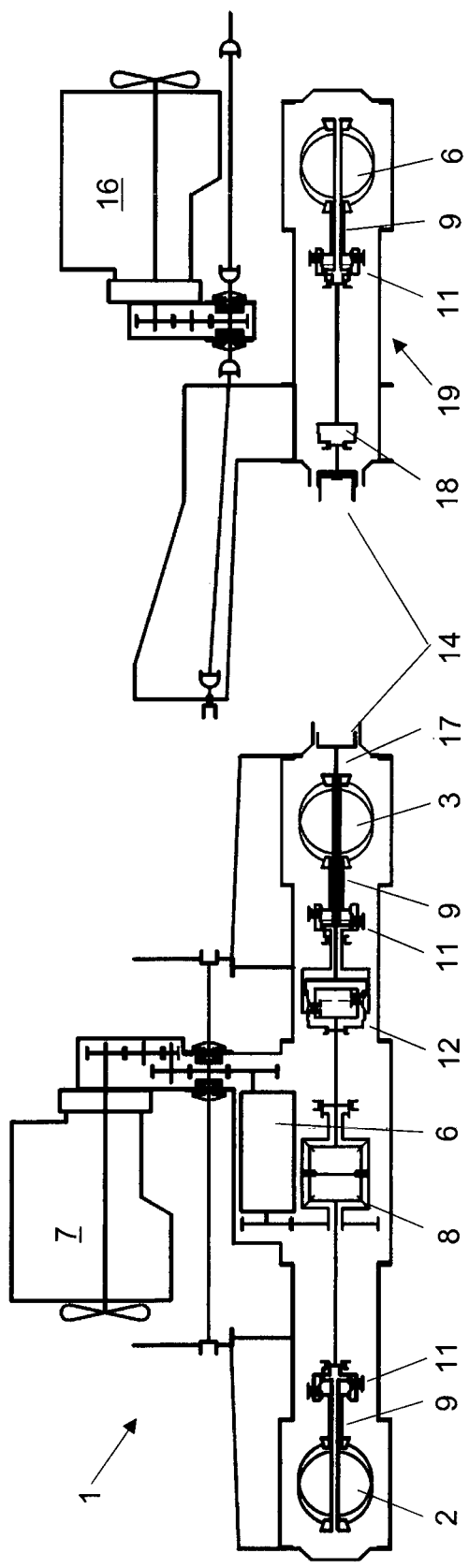
FIG. 9: a schematic illustration of the vehicle from FIG. 8 with an uncoupled additional engine.
Figure 10:
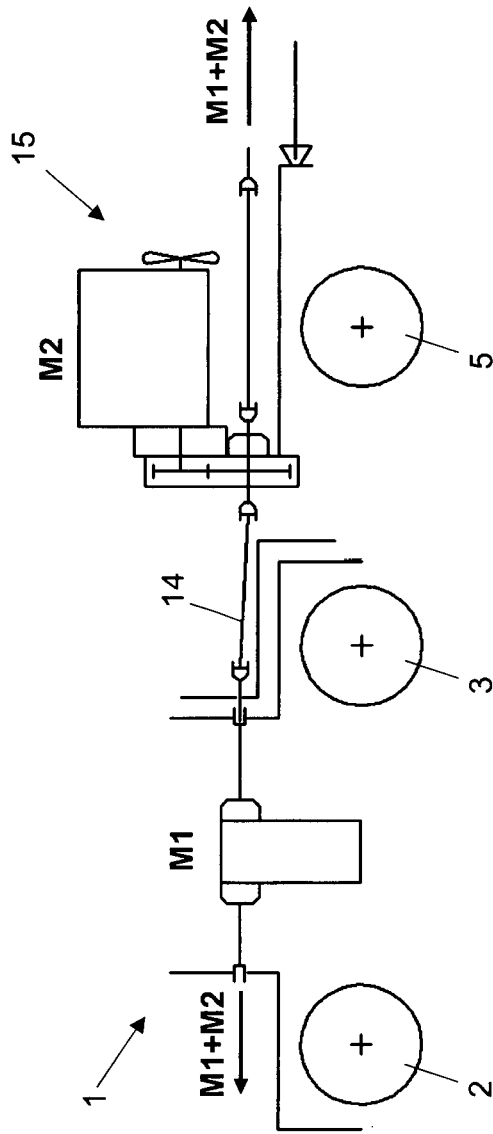
FIG. 10: a wiring diagram for the torque transmission with a coupled additional engine.

The powertrain can be extended in such a way that an additional engine is connected with the powertrain of the vehicle via a corresponding coupling device (FIGS. 8 and 9). A corresponding wiring diagram for the torques is illustrated in FIG. 10. With the particular coaxial arrangement of front and rear PTO (power take off) shaft coupling it is possible with the powertrain according to the disclosure or with the vehicle according to the disclosure to transmit additional power between front and rear PTO shaft on the vehicle, and to route this through the gearbox housing without having to transmit it via the gear wheels. An additional engine can be coupled to a vehicle front of a vehicle rear by means of a coupling device or a docking device. Power from the vehicle and the additional engine is totaled and variably distributed for propulsion, aggregate and auxiliary drives. PTO shaft-driven aggregates can optionally be coupled to the opposite positioned docking holder or to a docking holder on the additional engine module. It is therefore possible to distribute the entire system power of vehicle and additional engine via the PTO shaft to the aggregate, or variably to the aggregate, for propulsion and for auxiliary drives.

The fact that a vehicle according to the disclosure is equipped with a coupling device or a docking holder at the front in driving direction and against driving direction makes it possible to couple additional driven axles, which have corresponding docking inserts, fully automatically. Vehicles equipped for operating axles that can be coupled have a primary axle differential in front of the second axle. Such a primary axle differential distributes the torque between two axles and a vehicle-side claw coupling, which serves for torque transmission to the axle to be coupled to the third axle. If such a vehicle is operated without a third axle the primary axle differential is locked by means of a differential lock and the vehicle is operated as a permanent 4×4 drive.

An aggregate or axle module to be coupled has a corresponding coupling claw, a separating coupling and a transverse differential. With a method for docking or during the coupling process of the third axle the separating coupling is opened in order to ensure that the axle module-side coupling claw stands still when using the axle module. Once the coupling process is complete the separating coupling in the axle module is closed and the differential lock in the vehicle-side primary axle differential is opened. The powertrain of the vehicle thus constitutes a permanent 6×6 drive with a lockable longitudinal differential, primary axle differential and lockable transverse differentials on all three axles.

LIST OF REFERENCE NUMBERS

1 Vehicle
2 Front axle
3 Rear axle
4 second front axle
5 second rear axle
6 Gearbox
7 Engine
8 Longitudinal differential
9 Central tube module
10 Differential lock
11 lockable transverse differential/axle differential
12 Primary axle differential
13 Additional engine
14 Coupling device
15 Powertrain
16 Additional engine
17 Drive shaft
18 Separating coupling
19 Axle module to be coupled

The invention claimed is:

1. A vehicle, comprising
a gearbox (6)
a longitudinal differential (8),
a central tube module (9) for connecting at least one first axle (2, 3) with a powertrain (15) of the gearbox (6), wherein the at least one first axle (2, 3) is mounted on the central tube module (9) and the longitudinal differential (8) transmits the driving torque provided by the gearbox (6) via a drive shaft in the central tube module (9) to the at least one first axle (2, 3), and
the longitudinal differential and an axle differential (11) as well as the at least one first axle (2, 3) are arranged one after the other in the powertrain (15), wherein at least one further axle (4, 5) to be automatically coupled can be driven with a primary axle differential (12), which is arranged in front of the at least one first axle (2, 3), by means of the drive shaft (17) held by the axle differential (11) of the at least one first axle (2, 3) via a coupling device (14).

2. The vehicle according to claim 1, wherein the longitudinal differential (8) for distributing a driving torque to further axles (2, 3, 4, 5) is integrated into the gearbox (6).

3. The vehicle according to claim 2, wherein the longitudinal differential (8) has a differential lock (10).

4. The vehicle according to claim 1, wherein a lockable transverse differential (11) is integrated into the central tube module (9) as the axle differential (11).

5. The vehicle according to claim 1, wherein the primary axle differential (12) is integrated into a powertrain (15) between the axle (2, 3, 4, 5) and the longitudinal differential (8), for distributing the driving torque to further axles to be coupled, wherein the primary axle differential is lockable in order to transmit the driving torque only to a permanently mounted axle in a condition when it is not coupled with an axle.

6. Vehicle according to claim 1, wherein at least one further axle (2, 3, 4, 5) with an axle differential is permanently mounted on the at least one first axle (2, 3, 4, 5) via a central tube module (9), or disconnectably connected with the at least one first axle (2, 3, 4, 5) via the coupling device, wherein the axles (2, 3, 4, 5) then form two front or two, three or more rear axles (2, 3, 4, 5) of a vehicle (1).

7. The vehicle according to claim 1, wherein the central tube module (9) is a first central tube module (9) and that a second central tube module (9) is arranged on the gearbox (6) on a side that lies opposite the first central tube module in a longitudinal direction, preferably with an integrated lockable transverse differential (11), wherein a second axle (2, 3, 4, 5) with an axle differential is provided, wherein this second axle (2, 3, 4, 5) is mounted on the second central tube module (9) and the longitudinal differential (8) transmits the driving torque provided by the gearbox (6) to the axles (2, 3, 4, 5).

8. The vehicle according to claim 1, wherein a further axle (2, 3, 4, 5) with an axle differential is permanently mounted on the second axle via a central tube module (9), or is disconnectably connected with the second axle via a coupling device, wherein the axles (2, 3, 4, 5) then form two front or two rear axles (2, 3, 4, 5) of a vehicle (1).

9. The vehicle according to claim 1, wherein front and/or rear axle(s) (2, 3, 4, 5) are driven and/or are designed to be steerable.

10. The vehicle according to claim 1, wherein the vehicle has a first docking device, which is designed as a holder for a correspondingly designed docking device of an axle module (19) or an aggregate.

11. The vehicle according to claim 1, wherein an axle module (19) to be coupled comprises a docking means or a docking insert for the corresponding connection with the docking device of the vehicle (1), wherein a second side of a claw coupling for the coupling means (14) is integrated in the axle module to be coupled, as well as a central tube module with a separating coupling (18) and a lockable transverse differential (11) as an axle differential (11) and a driven axle (4, 5).

12. The vehicle according to claim 1, wherein two parts of a claw coupling (14) connecting the drive shaft are connected with each other by means of a coupling device in the coupled condition of an additional axle (4, 5) in an additional axle module (19), so that a torque transmission to the coupled axle (4, 5) is possible, wherein a separating coupling (18) is provided between the claw coupling (14) and a lockable transverse differential (11) as an axle differential (11) for the purpose of preventing the rotation of a docking insert-side claw element during the connection process, wherein the separating coupling (18) is closed after connecting or docking and a primary axle differential lock is opened.

* * * * *